United States Patent
Zhou et al.

(10) Patent No.: US 12,273,905 B2
(45) Date of Patent: Apr. 8, 2025

(54) DYNAMICALLY ACTIVATED CHANNEL MEASUREMENT RESOURCES FOR CROSS-CARRIER SCHEDULING

(71) Applicant: QUALCOMM Incorporated, San Diego, CA (US)

(72) Inventors: Yan Zhou, San Diego, CA (US); Tao Luo, San Diego, CA (US); Konstantinos Dimou, San Francisco, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 632 days.

(21) Appl. No.: 16/904,160

(22) Filed: Jun. 17, 2020

(65) Prior Publication Data
US 2021/0007116 A1 Jan. 7, 2021

Related U.S. Application Data

(60) Provisional application No. 62/871,075, filed on Jul. 5, 2019.

(51) Int. Cl.
*H04W 72/54* (2023.01)
*H04L 5/00* (2006.01)

(52) U.S. Cl.
CPC ........... *H04W 72/54* (2023.01); *H04L 5/0048* (2013.01); *H04L 5/0055* (2013.01)

(58) Field of Classification Search
CPC ........... H04W 72/1226; H04W 72/085; H04L 5/0055; H04L 5/0048; H04L 5/0098; H04L 5/001; H04L 1/18; H04B 7/0632
See application file for complete search history.

(56) References Cited

U.S. PATENT DOCUMENTS

| | | | |
|---|---|---|---|
| 10,959,232 B2* | 3/2021 | Wang | H04B 7/0617 |
| 11,191,108 B2 | 11/2021 | Islam et al. | |
| 2013/0010690 A1 | 1/2013 | Cheng et al. | |
| 2015/0341945 A1 | 11/2015 | Panchal | |
| 2019/0254110 A1* | 8/2019 | He | H04L 5/0048 |

FOREIGN PATENT DOCUMENTS

| | | |
|---|---|---|
| CN | 104350695 A | 2/2015 |
| EP | 2523491 A1 | 11/2012 |
| WO | 2018089265 | 5/2018 |

OTHER PUBLICATIONS

International Search Report and Written Opinion—PCT/US2020/038486—ISA/EPO—Aug. 26, 2020.

* cited by examiner

*Primary Examiner* — Justin T Van Roie
(74) *Attorney, Agent, or Firm* — Patterson+ Sheridan, L.L.P.

(57) ABSTRACT

Certain aspects of the present disclosure are generally directed to a method for wireless communication. The method generally includes determining whether to activate resources on one or more candidate component carriers (CCs) to be used for communication of one or more reference signals with a network based on a signal quality of a serving CC, communicating the one or more reference signals with the network if the resources on the one or more candidate CCs are activated based on the determination, and receiving a data transmission on one of the one or more candidate CCs after the communication of the one or more reference signals.

17 Claims, 10 Drawing Sheets

DYNAMICALLY ACTIVATED CHANNEL MEASUREMENT RESOURCES FOR CROSS-CARRIER SCHEDULING

CROSS-REFERENCE TO RELATED APPLICATION

This application claims benefit of and priority to U.S. Provisional Application No. 62/871,075, filed Jul. 5, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for channel measurement.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects of the present disclosure are generally directed to a method for wireless communication. The method generally includes determining whether to activate resources on one or more candidate component carriers (CCs) to be used for communication of one or more reference signals with a network based on a signal quality of a serving CC, communicating the one or more reference signals with the network if the resources on the one or more candidate CCs are activated based on the determination, and receiving a data transmission on one of the one or more candidate CCs after the communication of the one or more reference signals.

Certain aspects of the present disclosure are generally directed to a method for wireless communication. The method generally includes determining whether to activate resources on one or more candidate CCs to be used for communication of one or more reference signals with a user-equipment (UE) based on a signal quality of a serving CC, communicating the one or more reference signals with the UE if the resources on the one or more candidate CCs are activated based on the determination, selecting one of the one or more candidate CCs based on the one or more reference signals, and transmitting data on the one of the one or more candidate CCs.

Certain aspects of the present disclosure are generally directed to an apparatus for wireless communication. The apparatus generally includes a memory and one or more processors coupled to the memory, the one or more processors and the memory being configured to determine whether to activate resources on one or more candidate CCs to be used for communication of one or more reference signals with a network based on a signal quality of a serving CC, communicate the one or more reference signals with the network if the resources on the one or more candidate CCs are activated based on the determination, and receive a data transmission on one of the one or more candidate CCs after the communication of the one or more reference signals.

Certain aspects of the present disclosure are generally directed to an apparatus for wireless communication. The apparatus generally includes a memory and one or more processors coupled to the memory, the one or more processors and the memory being configured to determine whether to activate resources on one or more candidate CCs to be used for communication of one or more reference signals with a UE based on a signal quality of a serving CC, communicate the one or more reference signals with the UE if the resources on the one or more candidate CCs are activated based on the determination, select one of the one or more candidate CCs based on the one or more reference signals, and transmit data on the one of the one or more candidate CCs.

Certain aspects of the present disclosure are generally directed to an apparatus for wireless communication. The apparatus generally includes means for determining whether to activate resources on one or more candidate CCs to be used for communication of one or more reference signals with a network based on a signal quality of a serving CC, means for communicating the one or more reference signals with the network if the resources on the one or more candidate CCs are activated based on the determination, and means for receiving a data transmission on one of the one or more candidate CCs after the communication of the one or more reference signals.

Certain aspects of the present disclosure are generally directed to an apparatus for wireless communication. The apparatus generally includes means for determining whether to activate resources on one or more candidate CCs to be used for communication of one or more reference signals with a UE based on a signal quality of a serving CC, means for communicating the one or more reference signals with the UE if the resources on the one or more candidate CCs are activated based on the determination, means for selecting one of the one or more candidate CCs based on the one or more reference signals, and means for transmitting data on the one of the one or more candidate CCs.

Certain aspects of the present disclosure are generally directed to a computer readable medium having computer executable code stored thereon for wireless communication. The computer readable medium generally includes code for determining whether to activate resources on one or more candidate CCs to be used for communication of one or more reference signals with a network based on a signal quality of a serving CC, code for communicating the one or more reference signals with the network if the resources on the one or more candidate CCs are activated based on the determination, and code for receiving a data transmission on one of the one or more candidate CCs after the communication of the one or more reference signals.

Certain aspects of the present disclosure are generally directed to a computer readable medium having computer executable code stored thereon for wireless communication. The computer readable medium generally includes code for determining whether to activate resources on one or more candidate CCs to be used for communication of one or more reference signals with a UE based on a signal quality of a serving CC, code for communicating the one or more reference signals with the UE if the resources on the one or more candidate CCs are activated based on the determination, code for selecting one of the one or more candidate CCs based on the one or more reference signals, and code for transmitting data on the one of the one or more candidate CCs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for channel measurement. For example, certain aspects are directed to dynamically activating prescheduled resources for transmission of reference signals (e.g., channel state information-reference signal (CSI-RS) or sounding reference signal (SRS)) to be used for signal quality measurements. For instance, the prescheduled resources may be activated only when signal quality of a currently configured CC (also referred to as a "serving CC") has degraded. Otherwise, the prescheduled resources may be cancelled or reassigned to other UEs. As an example, the resources may be activated only when decoding of a data transmission on the configured CC has failed, or when a signal quality parameter associated with the configured CC has dropped below a threshold, as described in more detail herein.

The following description provides examples of traffic burst awareness in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
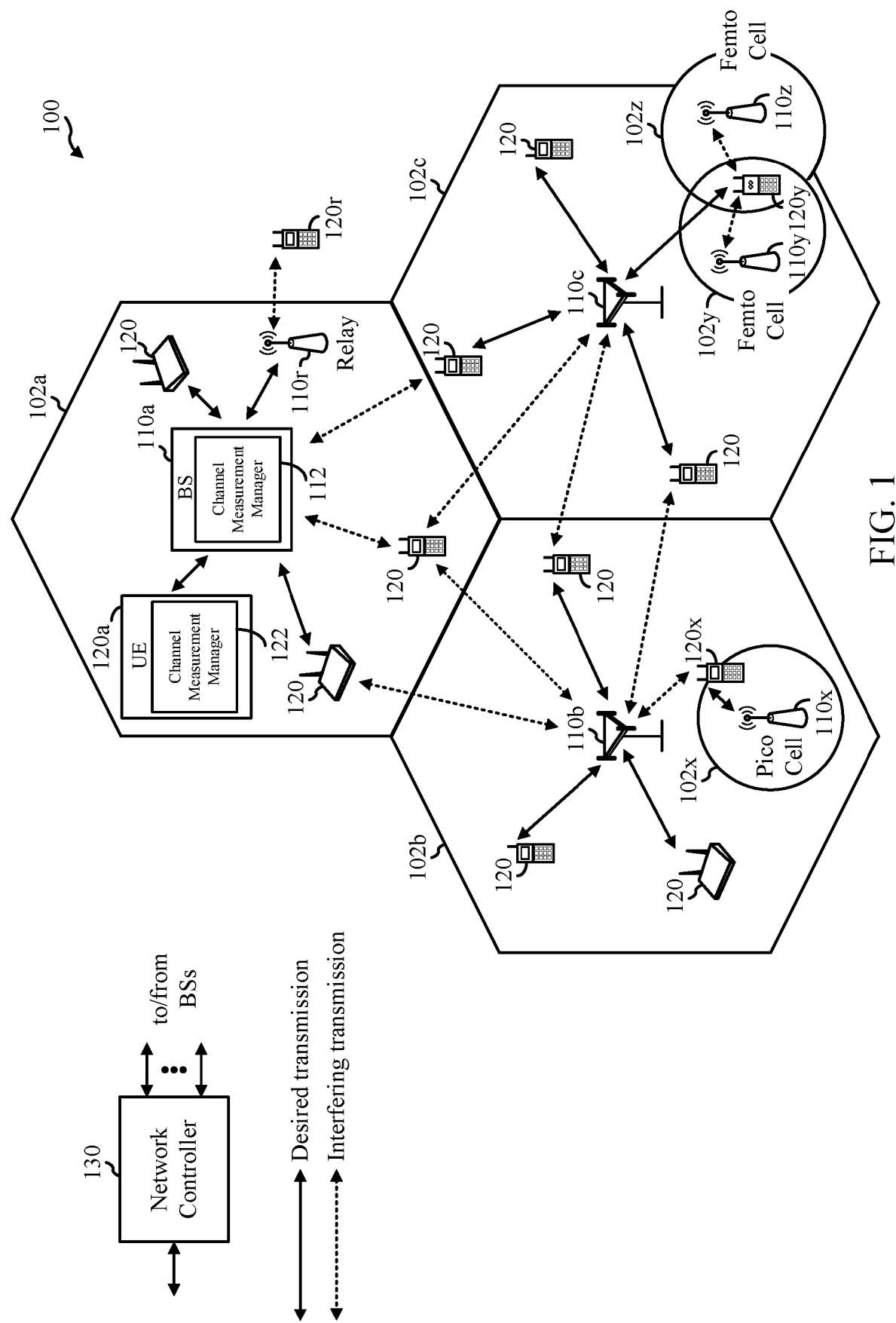
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for channel measurement. As shown in FIG. 1, the BS 110a includes a channel measurement manager 112. The channel measurement manager 112 may be configured to dynamically activate prescheduled resources for channel measurement, in accordance with aspects of the present disclosure. As shown in FIG. 1, the UE 120a includes a channel measurement manager 122. The channel measurement manager 122 may be configured to dynamically activate prescheduled resources for channel measurement, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
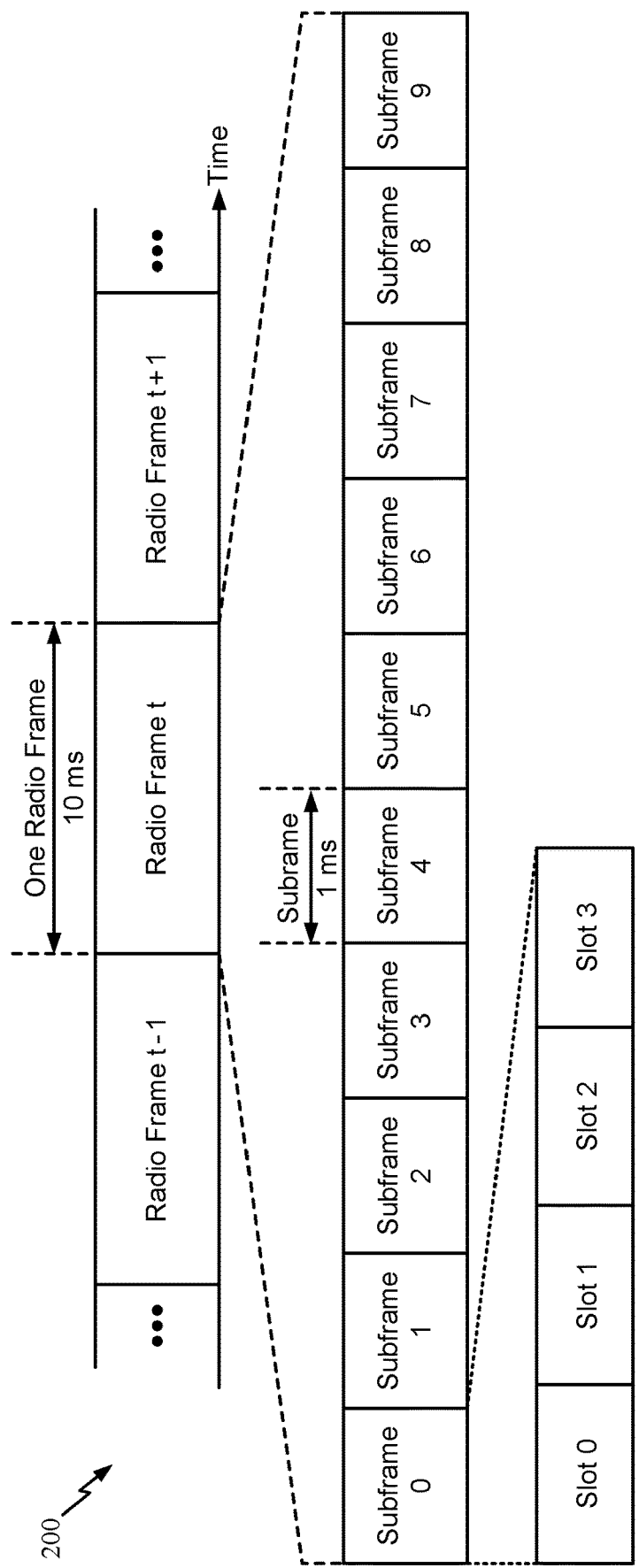
FIG. 2 is a diagram showing an example of a frame format 200.

FIG. 2 is a diagram showing an example of a frame format 200. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). In certain aspects, a subframe of the frame format 200 may be implemented using cross-carrier scheduling, as described in more detail herein.

Figure 3:
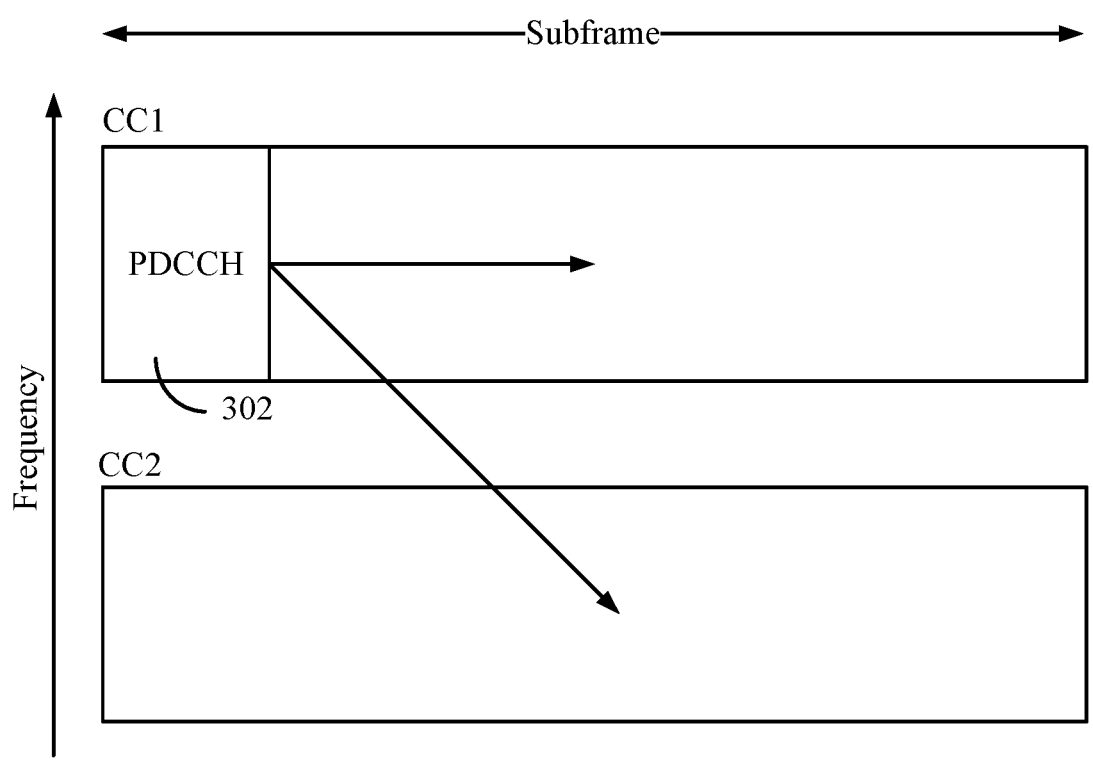
FIG. 3 illustrates example operations for cross-carrier scheduling.

FIG. 3 illustrates example operations for cross-carrier scheduling. As illustrated, the first component carrier (CC1) may include a physical downlink control channel (PDCCH) 302 that includes control information applicable to both CC1 and the second component carrier (CC2). For instance, CC1 may schedule resources for data transmission in both CC1 and CC2. CC1 may be referred to as the scheduling CC and CC2 may be referred to as the scheduled CC. Each component carrier is associated with a cell. While only two CCs are illustrated in FIG. 3, any number of CCs may be implemented, each of the CCs being associated with a frequency range (FR). In some cases, multiple CCs may be part of the same FR. For instance, CC1 may use a first FR (FR1) and CC2 may use a second FR (FR2). A configuration of each FR may be different. For instance, FR1 may have a smaller bandwidth (BW) than FR2, yet have less blocking issues. FR1 may have a lower sub-carrier spacing (SCS) than FR2. For example, FR1 may have a SCS of 60, whereas FR2 may have a SCS of 120.

Example Techniques for Cross-Carrier Retransmission

To facilitate cross-carrier scheduling with low latency and overhead, a user-equipment (UE) may indicate preferred candidate component carriers (CCs) in uplink (UL) feedback based on a latest measurement on candidate CC quality. In the presence of blocking, some candidate CCs may be affected more than others, while reference signals (e.g., channel state information-reference signal (CSI-RS)/sounding reference signal (SRS)) may be configured in every cycle to measure the latest candidate CC quality. However, this technique may increase overhead on the candidate CCs. For example, SRS or CSI-RS may be transmitted on the candidate CCs during transmission cycles (e.g., 1 ms period) to allow the UE to perform signal quality measurements for the candidate CCs.

Certain aspects of the present disclosure are directed to dynamically activating prescheduled resources for transmission of reference signals (e.g., CSI-RS or SRS) to be used for signal quality measurements. For instance, the prescheduled resources on candidate CCs may be activated only when signal quality of a currently configured CC (also referred to as a "serving CC") has degraded. Otherwise, the prescheduled resources may be cancelled or reassigned to other UEs. As an example, the resources may be activated only when decoding of a data transmission on the serving CC has failed, or when a signal quality parameter associated with the serving CC has dropped below a threshold, as described in more detail herein.

Figure 4:
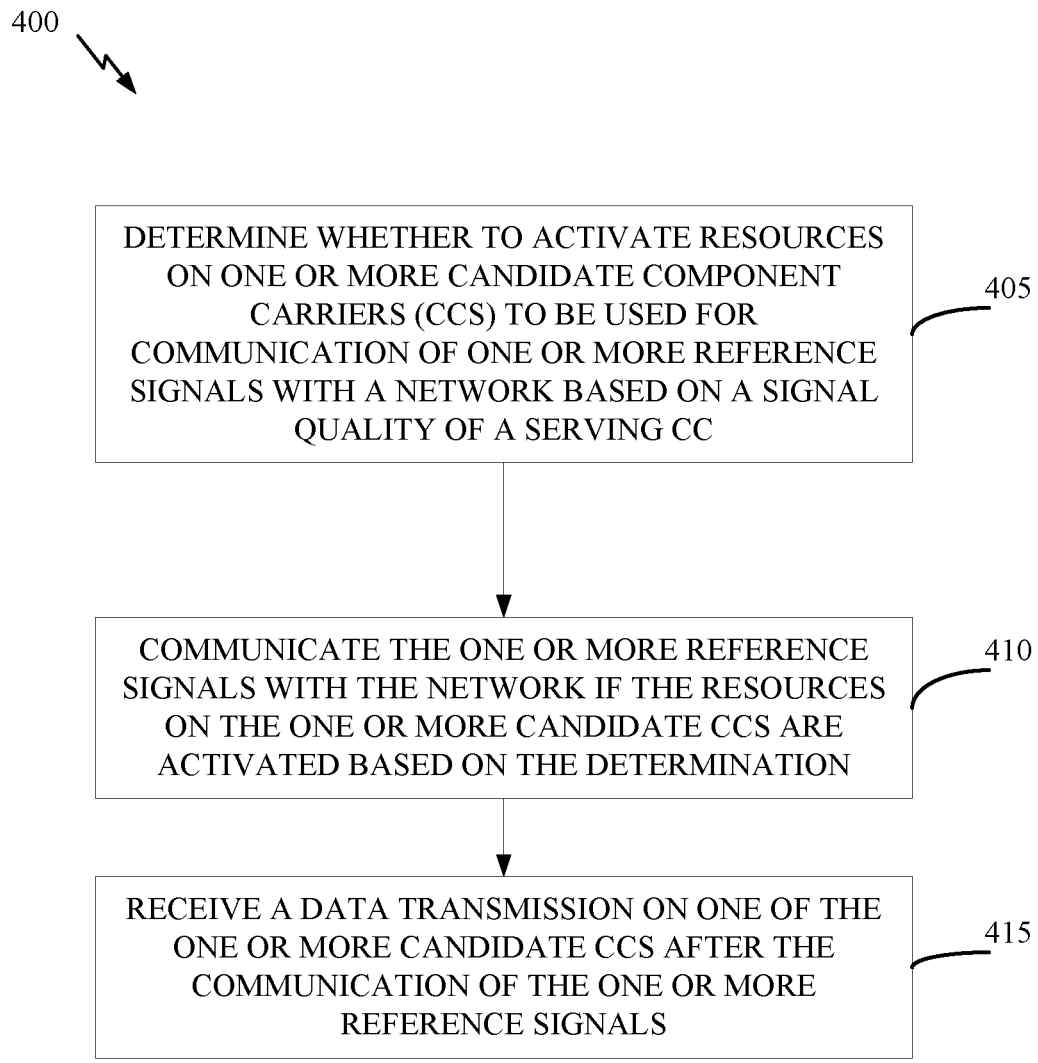
FIG. 4 is a flow diagram illustrating example operations for wireless communication by a user equipment (UE), in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., such as a UE 120a in the wireless communication network 100).

Figure 10:
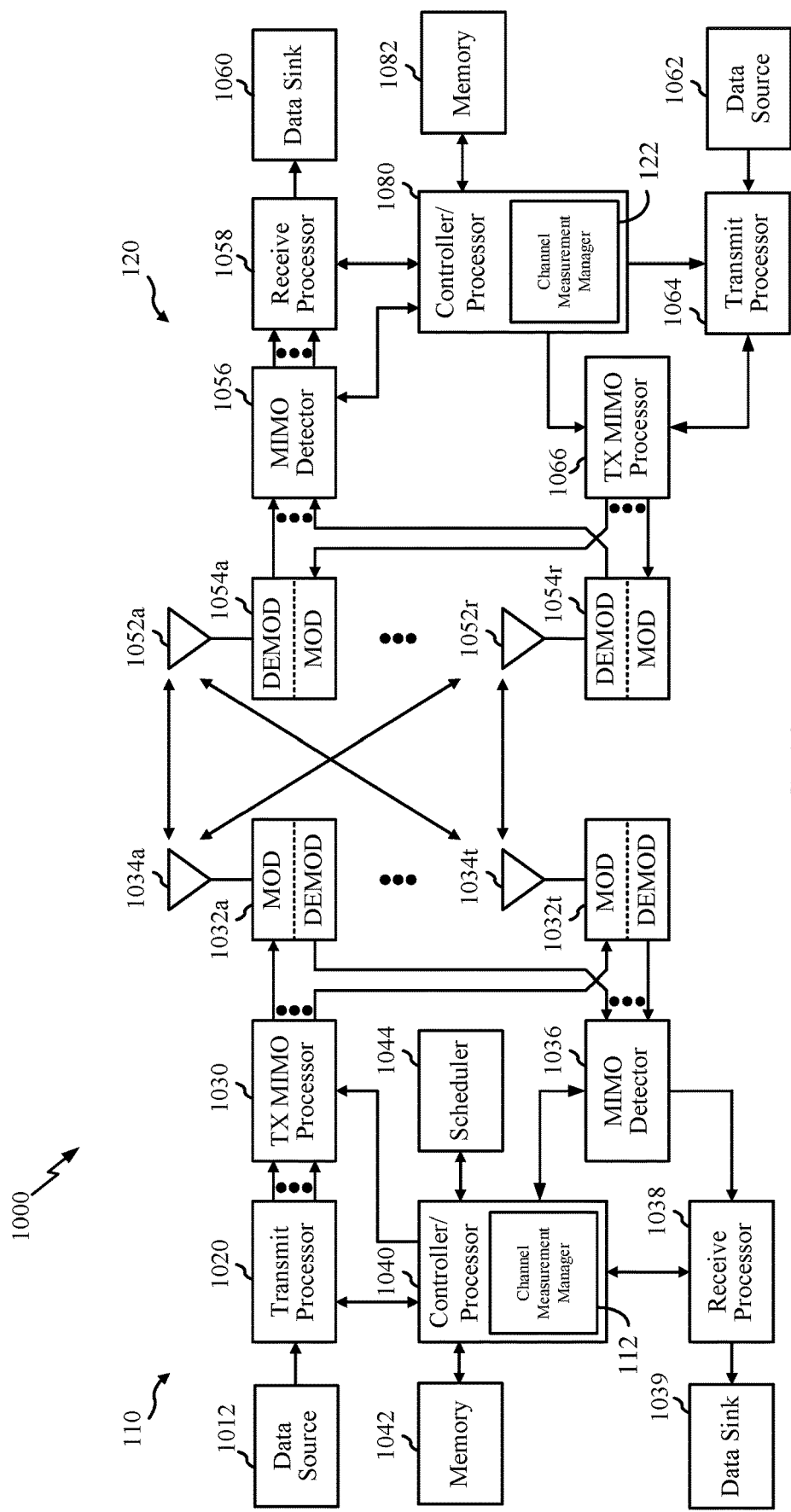
FIG. 10 is a block diagram conceptually illustrating a design of an example BS and UE, in accordance with certain aspects of the present disclosure.

Operations 400 may be implemented as software components that are executed and run on one or more processors (e.g., controller/processor 1080 of FIG. 10). Further, the transmission and reception of signals by the UE in operations 400 may be enabled, for example, by one or more antennas (e.g., antennas 1052 of FIG. 10). In certain aspects, the transmission and/or reception of signals by the UE may be implemented via a bus interface of one or more processors (e.g., controller/processor 1080) obtaining and/or outputting signals.

The operations 400 may begin at block 405, by a UE determining whether to activate resources (e.g., prescheduled resources) on one or more candidate CCs to be used for communication of one or more reference signals with a network based on a signal quality of a serving CC. At block 410, the UE may communicate the one or more reference signals with the network if the resources on the one or more candidate CCs are activated based on the determination. At block 415, the UE may receive a data transmission on one of the one or more candidate CCs after the communication of the one or more reference signals. In some cases, the one or more candidate CCs include the serving CC.

In certain aspects, the determining of whether to activate the resources on the one or more candidate CCs based on the signal quality of the serving CC may include determining whether to activate the resources on the one or more candidate CCs based on whether decoding of a transmission on the serving CC has failed. In other words, the failure of the decoding indicates a degraded signal quality, based on which the resources on the one or more candidate CCs may be activated for channel measurement. In some cases, the UE may transmit a negative acknowledgment (NACK) if the decoding of the transmission on the serving CC has failed.

In certain aspects, the UE may determine whether the signal quality of the serving CC is less than or equal to a threshold, where the one or more reference signals are to be communicated via the resources on the one or more candidate CCs if the signal quality is less than or equal to the threshold. In certain aspects, the UE may transmit an indication that the resources on the one or more candidate CCs are to be used for the communication of the one or more reference signals if the signal quality is less than or equal to the threshold.

In certain aspects, the communication of the one or more reference signals may include transmitting one or more SRSs to the network. In other aspects, the communication of the one or more reference signals may include receiving one or more CSI-RSs from the network. In this case, the UE may perform a signal quality measurement for each of the one or more candidate CCs based on the one or more CSI-RSs, and transmit feedback signaling indicating results of the signal quality measurements. In certain aspects, each of the one or more reference signals are communicated via a plurality of beams, allowing the BS to select one of the plurality beams (e.g., beams having the highest signal quality) for the data transmission. Thus, the data transmission may be received via one of the plurality of beams.

Figure 5:
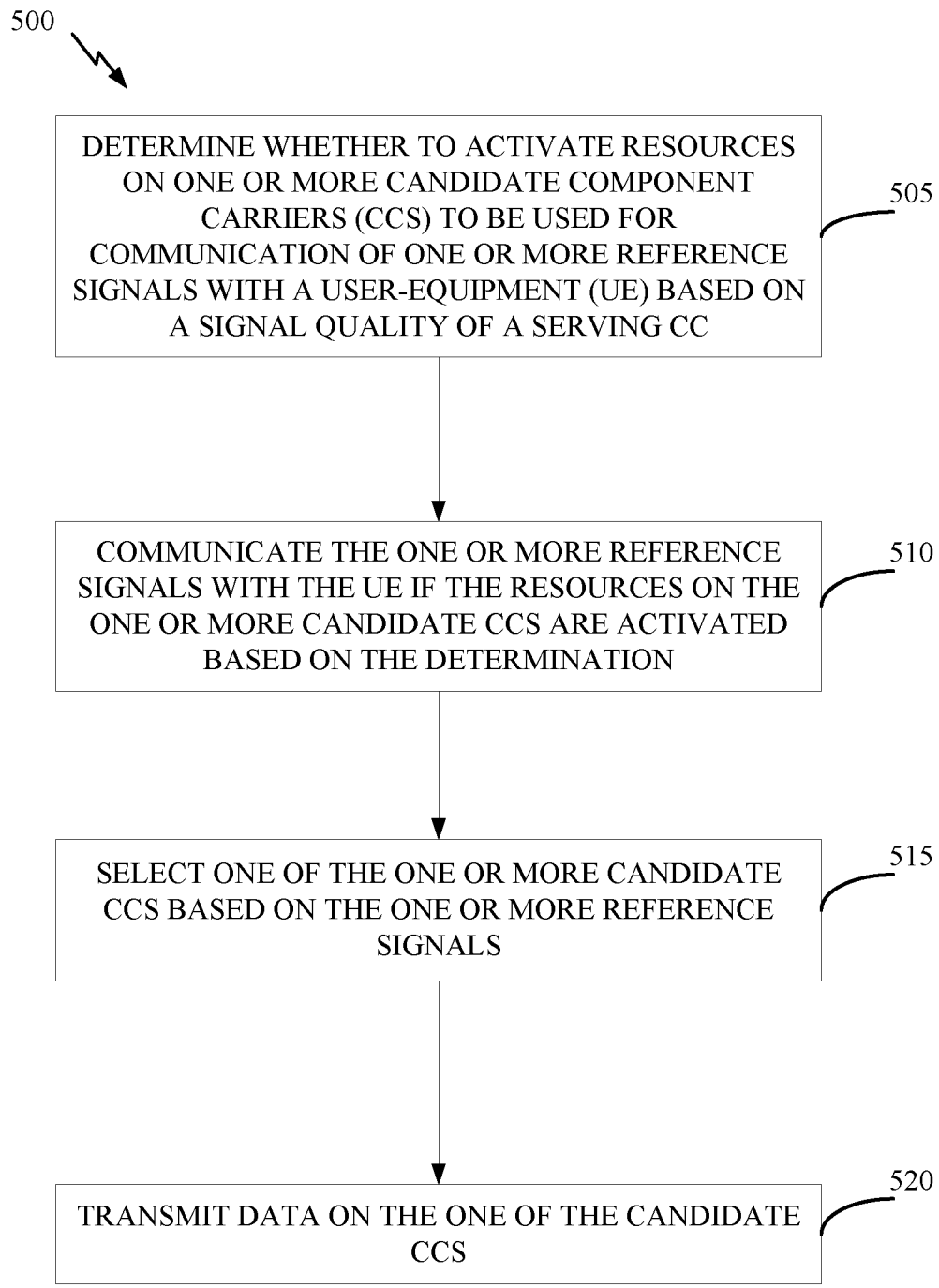
FIG. 5 is a flow diagram illustrating example operations for wireless communication by a base station (BS), in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100). The operations 500 may be complimentary operations by the BS to the operations 400 performed by the UE.

Operations 500 may be implemented as software components that are executed and run on one or more processors (e.g., controller/processor 1040 of FIG. 10). Further, the transmission and reception of signals by the BS in operations 500 may be enabled, for example, by one or more antennas (e.g., antennas 1034 of FIG. 13). In certain aspects, the transmission and/or reception of signals by the BS may be implemented via a bus interface of one or more processors (e.g., controller/processor 1040) obtaining and/or outputting signals.

The operations 500 may begin at block 505, by the BS determining whether to activate resources (e.g., prescheduled resources) on one or more candidate CCs to be used for communication of one or more reference signals with a UE based on a signal quality of a serving CC. At block 510, the BS may communicate the one or more reference signals with the UE if the resources on the one or more candidate CCs are activated based on the determination. At block 515, the BS may select one of the one or more candidate CCs based on the one or more reference signals, and at block 520, and transmit data on the one of the one or more candidate CCs.

Figure 6:
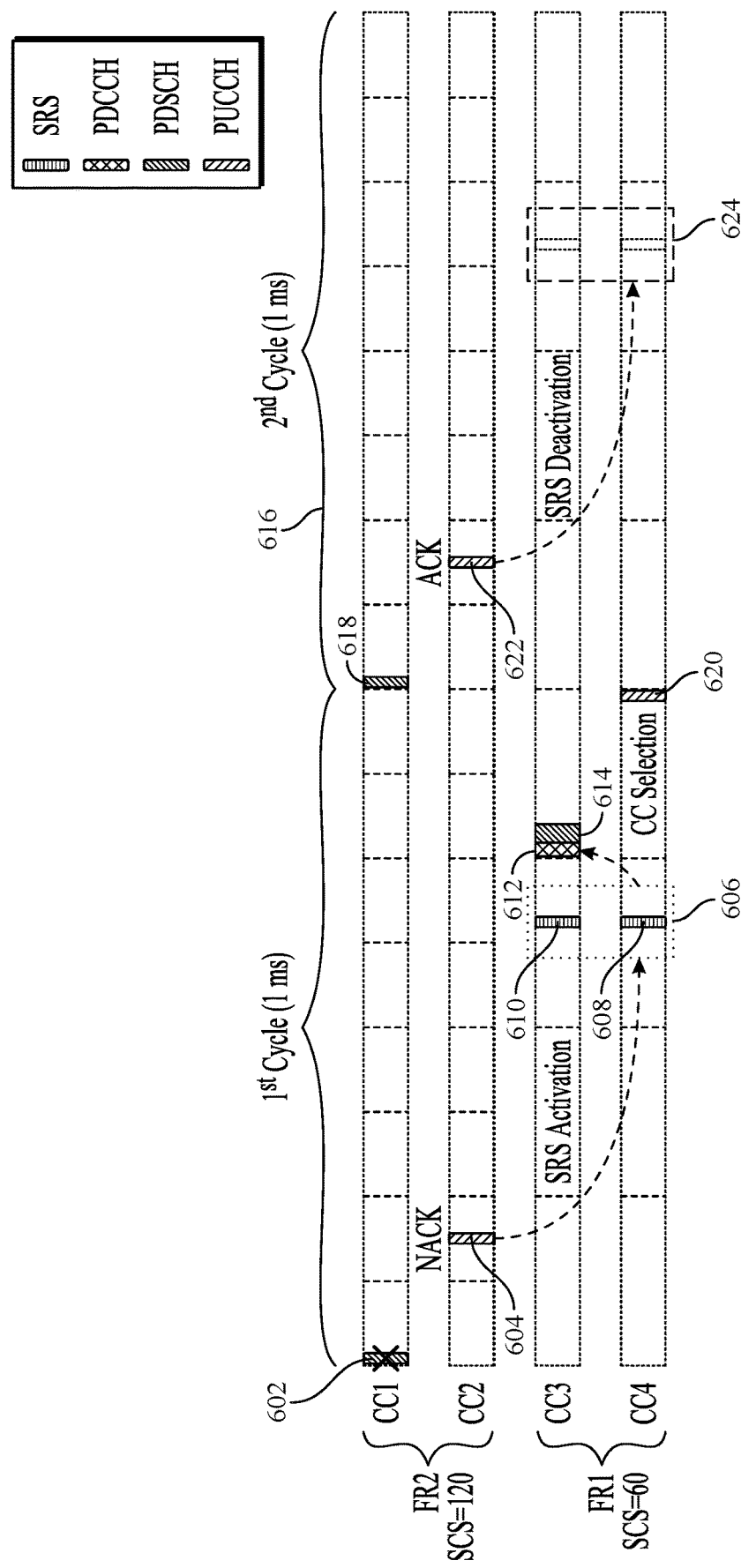
FIG. 6 illustrates dynamically activated resources for channel measurements, in accordance with certain aspects of the present disclosure.

FIG. 6 illustrates dynamically activated resources for channel measurements, in accordance with certain aspects of the present disclosure. As illustrated, decoding of the data transmission 602 (e.g., physical downlink shared channel (PDSCH)) may have failed on CC1 (serving CC). A control message 604 (e.g., physical uplink control channel (PUCCH)) may be transmitted by the UE 120. In some cases, the control message 604 may indicate a negative acknowledgement (NACK), indicating to the UE that decoding of the data transmission 602 has failed. In other cases, the UE may not indicate an acknowledgment (ACK) or a NACK corresponding to the data transmission 602, which may be referred to as a discontinuous transmission (DTX). For example, the UE may not have received control signaling for scheduling of the data transmission 602 and therefore, would not send any ACK or NACK for the data transmission.

As illustrated, in response to the failure of decoding of the data transmission 602, prescheduled resources 606 on candidate CCs (e.g., CC3 or CC4) for transmission of SRS (or reception of CSI-RS) may be activated. As illustrated, the UE may transmit SRSs 608, 610 using the prescheduled resources 606, which may be used by the BS 110 to perform channel measurements and select the best candidate CC for downlink data transmission. For example, the BS 110 may transmit a control message 612 (e.g., physical downlink control channel (PDCCH)) to schedule the downlink data transmission 614 (e.g., PDSCH) on CC3. In certain aspects, the UE may send an uplink control message 620 (e.g., PUCCH), indicating an ACK or NACK based on whether the decoding of the data transmission 614 was successful.

As illustrated, during the second cycle 616, the data transmission 618 may be decoded successfully. Thus, the UE may transmit an uplink control message 622 (e.g., PUCCH) acknowledging the data transmission 618. Therefore, the prescheduled resources 624 may be deactivated (e.g., cancelled or reassigned to other UEs).

In other words, to save overhead, channel measurement resources may be pre-configured on candidate CCs but activated only when certain conditions apply. Channel measurement resources may include SRS, CSI-RS, and corresponding UL reporting resource in case of CSI-RS. The resources may be activated implicitly when NACK/DTX is sent/received for a previous failed transmission. In certain aspects, the prescheduled resources may be activated explicitly by an indicator from the UE 120 to the BS 110 (e.g., gNB), for example, when a current CC quality (e.g., signal to noise plus interference ratio (SINR) or reference signal receive power (RSRP)) is below a threshold, which can be configured by the BS 110. As described herein, corresponding time/frequency resources may be canceled or reassigned to other UEs if the resources are not activated.

In certain aspects, the reference signals may be configured with a beam sweep pattern on a candidate CC, where SRS/CSI-RS is sent/received by different beam pair links. For example, each of the SRSs 608, 610 may be transmitted via different beams, allowing the signaling quality measurements to be performed for the different beams to determine a beam to use for the downlink data transmission. In certain aspects, to further reduce overhead, multiple UEs may share a pool of SRS resources and indicate a selected SRS resource in NACK (e.g., control message 604). For example, the resources 606 may be part of a shared (e.g., common) pool of resources of multiple UEs. Thus, during different cycles, different UEs may use the resources (e.g., for receiving CSI-RS) dependent on which UE is to perform channel measurements due to a degraded signal quality of a current CC of the UE.

Figure 7:
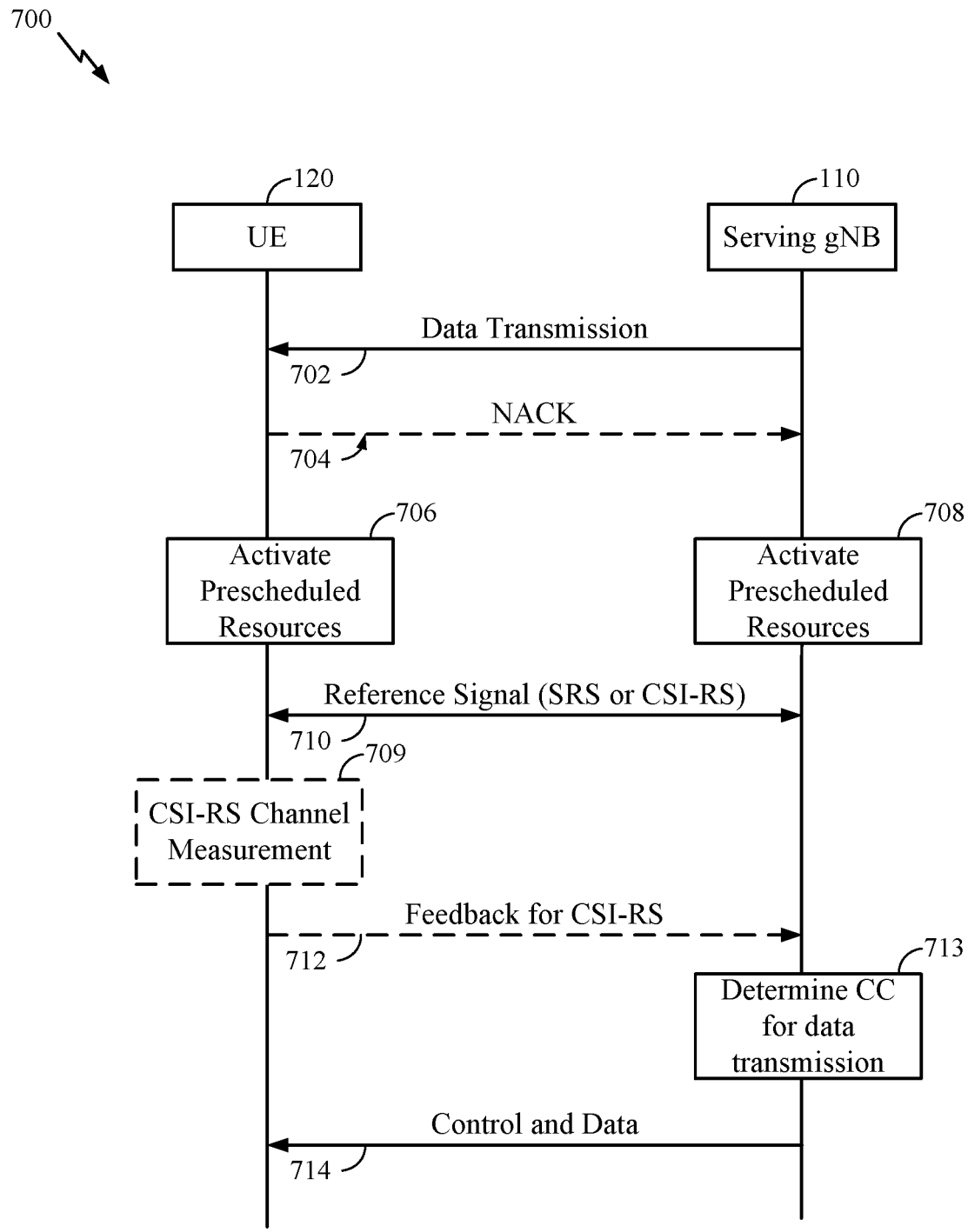
FIG. 7 is a call-flow diagram illustrating example operations for dynamically activating resources for channel measurements, in accordance with certain aspects of the present disclosure.

FIG. 7 is a call-flow diagram illustrating example operations 700 for dynamically activating resources for channel measurements, in accordance with certain aspects of the present disclosure. The dashed lines in FIG. 7 indicate optional steps. As illustrated, a data transmission 702 may be transmitted to the UE 120 via a serving CC. In some cases, the UE may be unable to properly decode the data transmission 702, and transmit a NACK 704. In other cases, the UE may not transmit a NACK if the UE did not receive previous control information scheduling the data transmission 702. At blocks 706, 708, prescheduled resources for communication of reference signals may be activated at the UE 120 and the BS 110. Once the prescheduled resources are activated, the resources may be used to communicate references signals 710. For example, the prescheduled resources may be used by the UE to transmit SRS to the BS 110, or receive CSI-RS from the BS 110, as described herein. In the case of the UE 120 receiving CSI-RS, the UE may perform channel measurement based on the CSI-RS, at block 709, and provide feedback signaling 712 indicating the channel measurement results. At block 713, the BS 110 determines a CC for data transmission. The BS 110 then transmits control and data 714 via the determined CC. For instance, the BS 110 may transmit control signaling scheduling the data transmission via the determined CC, followed by the data transmission.

Figure 8:
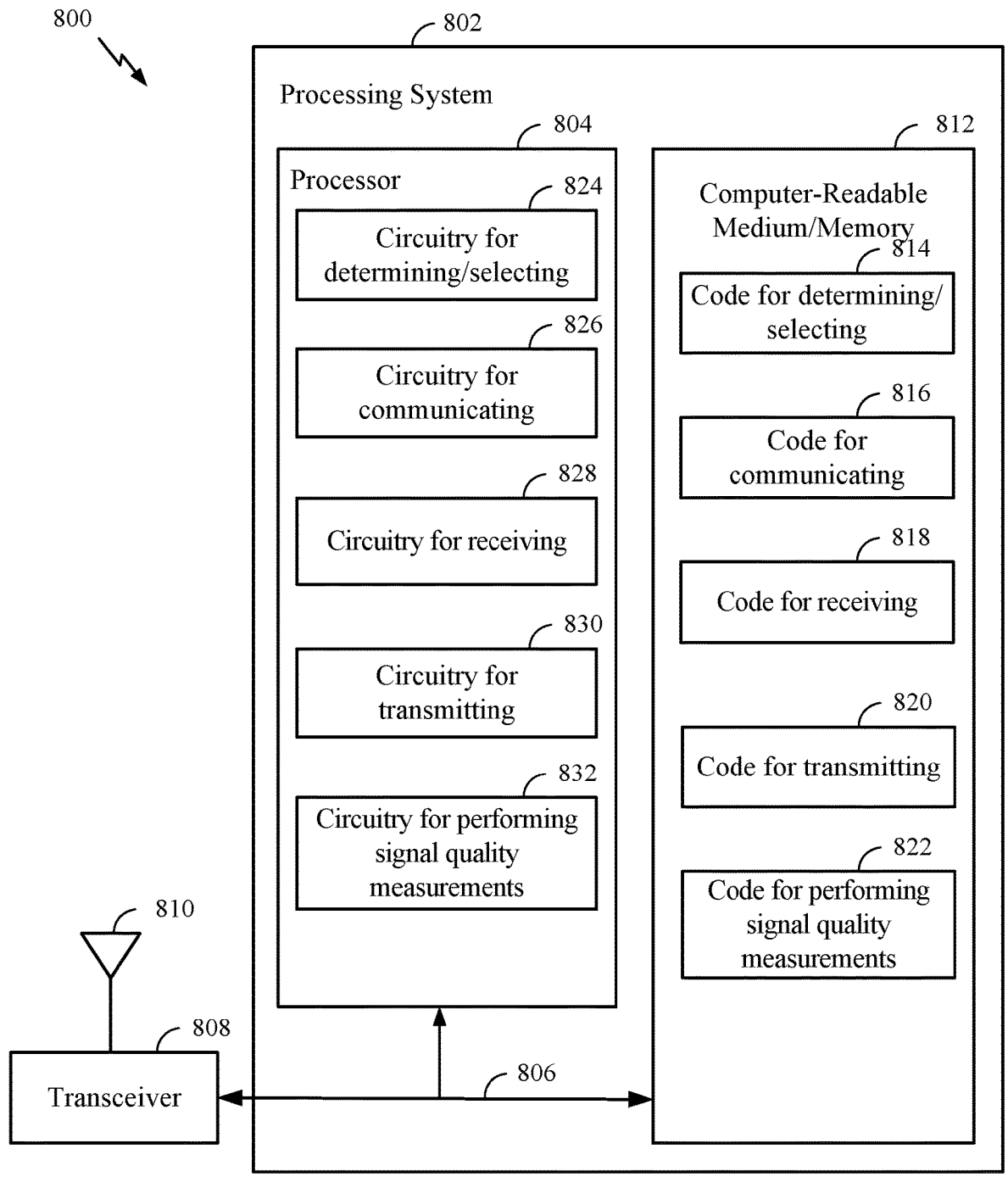
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4, or other operations for performing the various techniques discussed herein for channel measurement. In certain aspects, computer-readable medium/memory 812 stores code 814 for determining; code 816 for communicating, code 818 for receiving, code 820 for transmitting, and code 822 for performing signal quality measurements. In certain aspects, the processor 804 has circuitry configured to implement the code stored in the computer-readable medium/memory 812. The processor 804 includes circuitry 824 for determining; circuitry 826 for communicating, circuitry 828 for receiving, circuitry 830 for transmitting, and circuitry 832 for performing signal quality measurements.

Figure 9:
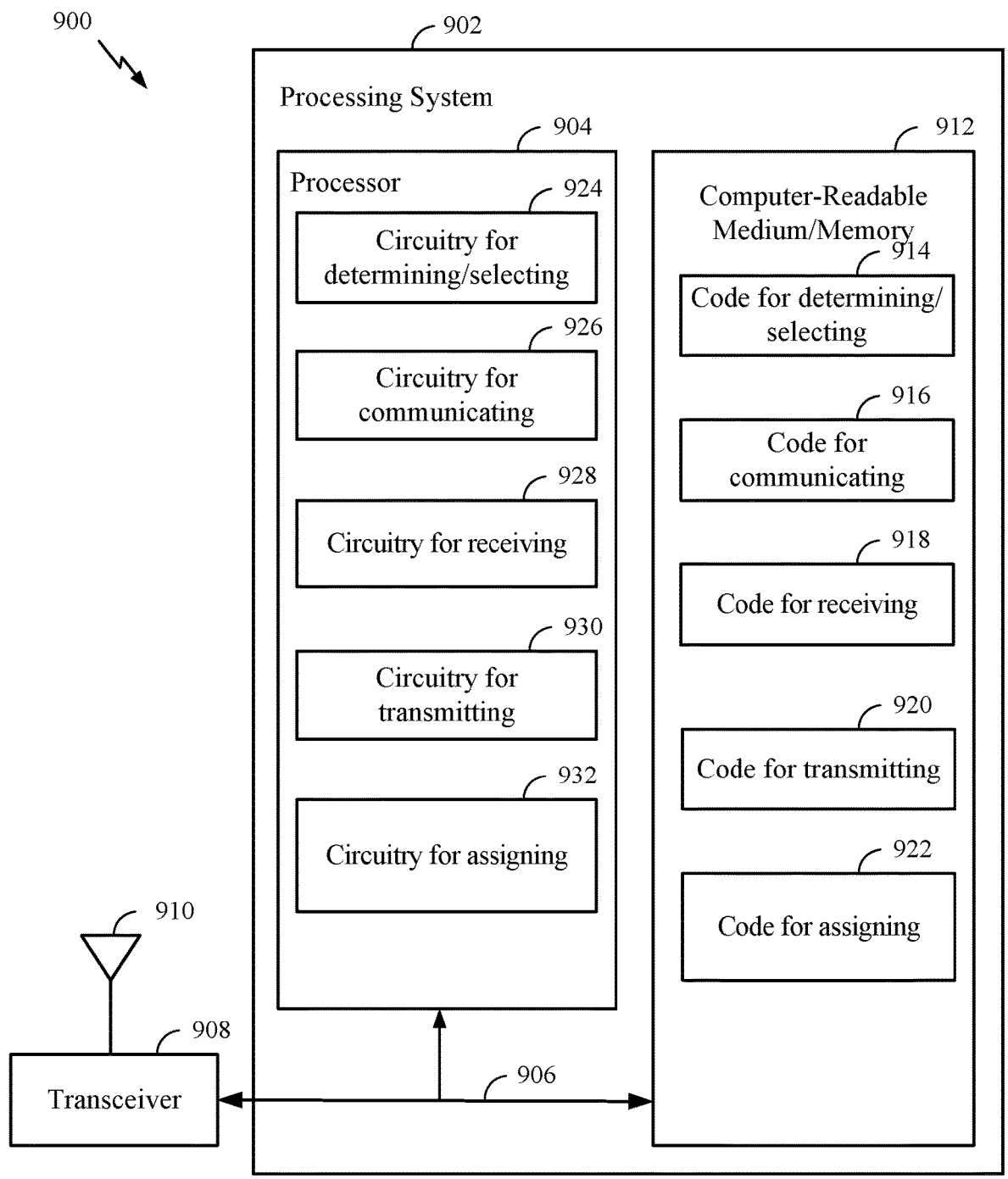
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5, or other operations for performing the various techniques discussed herein for cross-carrier retransmission. In certain aspects, computer-readable medium/memory 912 stores code 914 for determining; code 916 for communicating, code 918 for receiving, code 920 for transmitting, and code 922 for assigning. In certain aspects, the processor 904 has circuitry configured to implement the code stored in the computer-readable medium/memory 912. The processor 904 includes circuitry 924 for determining; circuitry 926 for communicating, circuitry 928 for receiving, circuitry 930 for transmitting, and circuitry 932 for assigning.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

FIG. 10 illustrates example components of BS 110a and UE 120a (e.g., in the wireless communication network 100 of FIG. 1), which may be used to implement aspects of the present disclosure.

At the BS 110a, a transmit processor 1020 may receive data from a data source 1012 and control information from a controller/processor 1040. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 1020 may process (e.g., encode and symbol map) the data and control information to obtain data symbols and control symbols, respectively. The transmit processor 1020 may also generate reference symbols, such as for the primary synchronization signal (PSS), secondary synchronization signal (SSS), and cell-specific reference signal (CRS). A transmit (TX) multiple-input multiple-output (MIMO) processor 1030 may perform spatial processing (e.g., precoding) on the data symbols, the control symbols, and/or the reference symbols, if applicable, and may provide output symbol streams to the modulators (MODs) 1032a-1032t. Each modulator 1032 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1032a-1032t may be transmitted via the antennas 1034a-1034t, respectively.

At the UE 120a, the antennas 1052a-1052r may receive the downlink signals from the BS 110a and may provide received signals to the demodulators (DEMODs) in transceivers 1054a-1054r, respectively. Each demodulator 1054 may condition (e.g., filter, amplify, downconvert, and digitize) a respective received signal to obtain input samples. Each demodulator may further process the input samples (e.g., for OFDM, etc.) to obtain received symbols. A MIMO detector 1056 may obtain received symbols from all the demodulators 1054a-1054r, perform MIMO detection on the received symbols if applicable, and provide detected symbols. A receive processor 1058 may process (e.g., demodulate, deinterleave, and decode) the detected symbols, provide decoded data for the UE 120a to a data sink 1060, and provide decoded control information to a controller/processor 1080.

On the uplink, at UE 120a, a transmit processor 1064 may receive and process data (e.g., for the physical uplink shared channel (PUSCH)) from a data source 1062 and control information (e.g., for the physical uplink control channel (PUCCH) from the controller/processor 1080. The transmit processor 1064 may also generate reference symbols for a reference signal (e.g., for the sounding reference signal (SRS)). The symbols from the transmit processor 1064 may be precoded by a TX MIMO processor 1066 if applicable, further processed by the demodulators in transceivers 1054a-1054r (e.g., for SC-FDM, etc.), and transmitted to the BS 110a. At the BS 110a, the uplink signals from the UE 120a may be received by the antennas 1034, processed by the modulators 1032, detected by a MIMO detector 1036 if applicable, and further processed by a receive processor 1038 to obtain decoded data and control information sent by the UE 120a. The receive processor 1038 may provide the decoded data to a data sink 1039 and the decoded control information to the controller/processor 1040.

The memories 1042 and 1082 may store data and program codes for BS 110a and UE 120a, respectively. A scheduler 1044 may schedule UEs for data transmission on the downlink and/or uplink.

The controller/processor 1080 and/or other processors and modules at the UE 120a may perform or direct the execution of processes for the techniques described herein. For example, as shown in FIG. 10, the controller/processor 1040 of the BS 110a has a channel measurement manager 112 that may be configured for dynamically activating prescheduled resources for channel measurement, according to aspects described herein. As shown in FIG. 10, the controller/processor 1080 of the UE 120a has a channel measurement manager 122 that may be configured for dynamically activating prescheduled resources for channel measurement, according to aspects described herein. Although shown at the Controller/Processor, other components of the UE 120a and BS 110a may be used performing the operations described herein.

Example Aspects

In a first aspect, the method for wireless communication by a user-equipment (UE), comprising determining whether to activate resources on one or more candidate component carriers (CCs) to be used for communication of one or more reference signals with a network based on a signal quality of a serving CC; communicating the one or more reference signals with the network if the resources on the one or more candidate CCs are activated based on the determination; and receiving a data transmission on one of the one or more candidate CCs after the communication of the one or more reference signals.

In a second aspect, in combination with the first aspect, the determining of whether to activate the resources on the one or more candidate CCs based on the signal quality of the serving CC comprises determining whether to activate the resources on the one or more candidate CCs based on whether decoding of a transmission on the serving CC has failed.

In a third aspect, in combination with the second aspect, the method further comprises transmitting a negative acknowledgment (NACK) if the decoding of the transmission on the serving CC has failed.

In a fourth aspect, in combination with one or more of the first aspect to the third aspect, the one or more candidate CCs include the serving CC.

In a fifth aspect, in combination with one or more of the first aspect to the fourth aspect, the method further comprises determining whether the signal quality of the serving CC is less than or equal to a threshold, wherein the one or more reference signals are to be communicated via the resources on the one or more candidate CCs if the signal quality is less than or equal to the threshold.

In a sixth aspect, in combination with the fifth aspect, the method further comprises transmitting an indication that the resources on the one or more candidate CCs are to be used for the communication of the one or more reference signals if the signal quality is less than or equal to the threshold.

In a seventh aspect, in combination with one or more of the first aspect through the sixth aspect, the communication of the one or more reference signals comprises transmitting one or more sounding reference signals (SRSs) to the network.

In an eighth aspect, in combination with one or more of the first aspect through the seventh aspect, the communication of the one or more reference signals comprises receiving one or more channel state information-reference signals (CSI-RSs) from the network, the method further comprising: performing a signal quality measurement for each of the one or more candidate CCs based on the one or more CSI-RSs; and transmitting feedback signaling indicating results of the signal quality measurements.

In an ninth aspect, in combination with one or more of the first aspect through the eighth aspect, each of the one or more reference signals is communicated via a plurality of beams, the data transmission being received via one of the plurality of beams.

In a tenth aspect, a method for wireless communication, comprising determining whether to activate resources on one or more candidate component carriers (CCs) to be used for communication of one or more reference signals with a UE based on a signal quality of a serving CC; communicating the one or more reference signals with the UE if the resources on the one or more candidate CCs are activated based on the determination; selecting one of the one or more candidate CCs based on the one or more reference signals; and transmitting data on the one of the one or more candidate CCs.

In an eleventh aspect, in combination with the tenth aspect, the one or more candidate CCs include the serving CC.

In a twelfth aspect, in combination with one or more of the tenth aspect and the eleventh aspect, the determining of whether to activate the resources on the one or more candidate CCs based on the signal quality of the serving CC comprises determining whether to activate the resources on the one or more candidate CCs based on whether an acknowledgement corresponding to a previous data transmission on the serving CC has been received.

In a thirteenth aspect, in combination with the twelfth aspect, the method further comprises receiving a negative acknowledgment (NACK) corresponding to the previous data transmission, the resources on the one or more candidate CCs being activated for the communication of the one or more reference signals in response to the reception of the NACK.

In a fourteen aspect, in combination with one or more of the tenth aspect through the thirteenth aspect, the method further comprising receiving an indication that the signal quality of the serving CC is less than or equal to a threshold, wherein the determination of whether to activate the resources on the one or more candidate CCs is based on the indication.

In a fifteenth aspect, in combination with one or more of the tenth aspect through the fourteenth aspect, the communication of the one or more reference signals comprises receiving one or more sounding reference signals (SRSs) from the UE.

In a sixteenth aspect, in combination with one or more of the tenth aspect through the fifteenth aspect, the communication of the one or more reference signals comprises transmitting one or more channel state information-reference signals (CSI-RSs), the method further comprising: receiving feedback signaling indicating results of signal quality measurements performed based on the one or more CSI-RSs, the selection of the one of the one or more candidate CCs being based on the feedback signaling.

In a seventeenth aspect, in combination with one or more of the tenth aspect through the sixteenth aspect, each of the one or more reference signals is communicated via a plurality of beams, the method further comprising selecting one of the plurality of beams based on a signal quality associated with each of the plurality of beams, the transmission of the data being via the one of the plurality of beams.

In an eighteenth aspect, in combination with one or more of the tenth aspect through the seventeenth aspect, the method further comprising assigning the resources on the one or more candidate CCs to another UE if the resources on the one or more candidate CCs are not activated to be used for the communication of the one or more reference signals with the UE.

In a nineteenth aspect, in combination with the eighteenth aspect the resources on the one or more candidate CCs are part of a common pool of resources shared by the UE and the other UE.

In a twentieth aspect, an apparatus for wireless communication by a user equipment (UE), comprising: a memory; and one or more processors coupled to the memory, the one or more processors and the memory being configured to: determine whether to activate resources on one or more candidate component carriers (CCs) to be used for communication of one or more reference signals with a network based on a signal quality of a serving CC; communicate the one or more reference signals with the network if the resources on the one or more candidate CCs are activated based on the determination; and receive a data transmission on one of the one or more candidate CCs after the communication of the one or more reference signals.

In a twenty-first aspect, in combination with the twentieth aspect, the determining of whether to activate the resources on the one or more candidate CCs based on the signal quality of the serving CC comprises determining whether to activate the resources on the one or more candidate CCs based on whether decoding of a transmission on the serving CC has failed.

In a twenty-second aspect, in combination with the twenty-first aspect, the one or more processors and the memory are further configured to transmit a negative acknowledgment (NACK) if the decoding of the transmission on the serving CC has failed.

In a twenty-third aspect, in combination with one or more of the twentieth aspect through the twenty second aspect, the one or more candidate CCs include the serving CC.

In a twenty-fourth aspect, in combination with one or more of the twentieth aspect through the twenty-third aspect, the one or more processors and the memory are further configured to determine whether the signal quality of the serving CC is less than or equal to a threshold, wherein the one or more reference signals are to be communicated via the resources on the one or more candidate CCs if the signal quality is less than or equal to the threshold.

In a twenty-fifth aspect, an apparatus for wireless communication, comprising: a memory; and one or more processors coupled to the memory, the one or more processors and the memory being configured to: determine whether to activate resources on one or more candidate component carriers (CCs) to be used for communication of one or more reference signals with a user-equipment (UE) based on a signal quality of a serving CC; communicate the one or more reference signals with the UE if the resources on the one or more candidate CCs are activated based on the determination; select one of the one or more candidate CCs based on the one or more reference signals; and transmit data on the one of the one or more candidate CCs.

In a twenty-sixth aspect, in combination with the twenty-fifth aspect, the one or more candidate CCs include the serving CC.

In a twenty-seventh aspect, in combination with the twenty-fifth aspect and the twenty-sixth aspect, the determining of whether to activate the resources on the one or more candidate CCs based on the signal quality of the serving CC comprises determining whether to activate the resources on the one or more candidate CCs based on whether an acknowledgement corresponding to a previous data transmission on the serving CC has been received.

In a twenty-eighth aspect, in combination with the twenty-seventh aspect the one or more processors and the memory are further configured to receive an indication that the signal quality of the serving CC is less than or equal to a threshold, wherein the determination of whether to activate the resources on the one or more candidate CCs is based on the indication.

In a twenty-ninth aspect, in combination with one or more of the twenty-fifth aspect through the twenty-eighth aspect, the one or more processors and the memory are further configured to receive an indication that the signal quality of the serving CC is less than or equal to a threshold, wherein the determination of whether to activate the resources on the one or more candidate CCs is based on the indication.

In a thirtieth aspect, in combination with one or more of aspect twenty-five through aspect twenty-nine, the communication of the one or more reference signals comprises receiving one or more sounding reference signals (SRSs) from the UE.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
   determining whether to activate resources on one or more candidate component carriers (CCs) to be used for communication of one or more reference signals with a network based on a signal quality of a serving CC, wherein the determining of whether to activate the resources on the one or more candidate CCs based on the signal quality of the serving CC comprises determining whether to activate the resources on the one or more candidate CCs based on whether decoding of a transmission on the serving CC has failed;
   communicating the one or more reference signals with the network if the resources on the one or more candidate CCs are activated based on the determination; and
   receiving a data transmission on one of the one or more candidate CCs after the communication of the one or more reference signals.

2. The method of claim 1, further comprising transmitting a negative acknowledgment (NACK) if the decoding of the transmission on the serving CC has failed.

3. The method of claim 1, wherein the one or more candidate CCs include the serving CC.

4. The method of claim 1, wherein the communication of the one or more reference signals comprises transmitting one or more sounding reference signals (SRSs) to the network.

5. The method of claim 1, wherein the communication of the one or more reference signals comprises receiving one or more channel state information-reference signals (CSI-RSs) from the network, the method further comprising:

performing a signal quality measurement for each of the one or more candidate CCs based on the one or more CSI-RSs; and transmitting feedback signaling indicating results of the signal quality measurements.

6. The method of claim 1, wherein each of the one or more reference signals is communicated via a plurality of beams, the data transmission being received via one of the plurality of beams.

7. A method for wireless communication, comprising:
determining whether to activate prescheduled resources on one or more candidate component carriers (CCs) to be used for communication of one or more reference signals with a user-equipment (UE) based on a signal quality of a serving CC, wherein the determining of whether to activate the prescheduled resources on the one or more candidate CCs based on the signal quality of the serving CC comprises determining whether to activate the prescheduled resources on the one or more candidate CCs based on whether an acknowledgement corresponding to a previous data transmission on the serving CC has been received;
receiving, in a control message from the UE, a negative acknowledgment (NACK) corresponding to the previous data transmission;
communicating the one or more reference signals with the UE via the prescheduled resources on the one or more candidate CCs, wherein the prescheduled resources are activated in response to the reception of the NACK;
selecting one of the one or more candidate CCs based on the one or more reference signals; and
transmitting data on the one of the one or more candidate CCs.

8. The method of claim 7, wherein the one or more candidate CCs include the serving CC.

9. The method of claim 7, wherein the communication of the one or more reference signals comprises receiving one or more sounding reference signals (SRSs) from the UE.

10. The method of claim 7, wherein the communication of the one or more reference signals comprises transmitting one or more channel state information-reference signals (CSI-RSs), the method further comprising:
receiving feedback signaling indicating results of signal quality measurements performed based on the one or more CSI-RSs, the selection of the one of the one or more candidate CCs being based on the feedback signaling.

11. The method of claim 7, wherein each of the one or more reference signals is communicated via a plurality of beams, the method further comprising selecting one of the plurality of beams based on a signal quality associated with each of the plurality of beams, the transmission of the data being via the one of the plurality of beams.

12. An apparatus for wireless communication by a user equipment (UE), comprising:
memory; and
one or more processors coupled to the memory, the memory comprising instructions that when executed by the one or more processors, individually or collectively, cause the apparatus to:
determine whether to activate resources on one or more candidate component carriers (CCs) to be used for communication of one or more reference signals with a network based on a signal quality of a serving CC, wherein the determining of whether to activate the resources on the one or more candidate CCs based on the signal quality of the serving CC comprises determining whether to activate the resources on the one or more candidate CCs based on whether decoding of a transmission on the serving CC has failed;
communicate the one or more reference signals with the network if the resources on the one or more candidate CCs are activated based on the determination; and
receive a data transmission on one of the one or more candidate CCs after the communication of the one or more reference signals.

13. The apparatus of claim 12, wherein the instructions when executed by the one or more processors, individually or collectively, further cause the apparatus to transmit a negative acknowledgment (NACK) if the decoding of the transmission on the serving CC has failed.

14. The apparatus of claim 12, wherein the one or more candidate CCs include the serving CC.

15. An apparatus for wireless communication, comprising:
memory; and
one or more processors coupled to the memory, the memory comprising instructions that when executed by the one or more processors, individually or collectively, cause the apparatus to:
determine whether to activate prescheduled resources on one or more candidate component carriers (CCs) to be used for communication of one or more reference signals with a user-equipment (UE) based on a signal quality of a serving CC, wherein the determining of whether to activate the prescheduled resources on the one or more candidate CCs based on the signal quality of the serving CC comprises determining whether to activate the prescheduled resources on the one or more candidate CCs based on whether an acknowledgement corresponding to a previous data transmission on the serving CC has been received;
receive a negative acknowledgment (NACK) corresponding to the previous data transmission;
communicate the one or more reference signals with the UE via the prescheduled resources on the one or more candidate CCs, wherein the prescheduled resources are activated in response to the reception of the NACK;
select one of the one or more candidate CCs based on the one or more reference signals; and
transmit data on the one of the one or more candidate CCs.

16. The apparatus of claim 15, wherein the one or more candidate CCs include the serving CC.

17. The apparatus of claim 15, wherein the communication of the one or more reference signals comprises receiving one or more sounding reference signals (SRSs) from the UE.

* * * * *